(12) United States Patent
Sugisaka et al.

(10) Patent No.: US 8,223,284 B2
(45) Date of Patent: Jul. 17, 2012

(54) LIQUID CRYSTAL DEVICE AND TELEVISION RECEIVER

(75) Inventors: Akane Sugisaka, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 126 days.

(21) Appl. No.: 12/745,169

(22) PCT Filed: Jul. 29, 2008

(86) PCT No.: PCT/JP2008/063554
§ 371 (c)(1),
(2), (4) Date: May 27, 2010

(87) PCT Pub. No.: WO2009/078192
PCT Pub. Date: Jun. 25, 2009

(65) Prior Publication Data
US 2010/0253857 A1    Oct. 7, 2010

(30) Foreign Application Priority Data
Dec. 19, 2007   (JP) .................................. 2007-327431

(51) Int. Cl.
*G02F 1/1368*   (2006.01)
*G02F 1/1343*   (2006.01)
*G02F 1/133*    (2006.01)

(52) U.S. Cl. ............................. 349/39; 349/37; 349/42

(58) Field of Classification Search .................... 349/37, 349/38, 39, 42; 257/59, 72; 345/92, 96; 348/790, 791
See application file for complete search history.

(56) References Cited

U.S. PATENT DOCUMENTS

| 2006/0232539 A1 | 10/2006 | Hashimoto |
| 2008/0002076 A1* | 1/2008 | Yagi et al. ....................... 349/39 |
| 2009/0065778 A1 | 3/2009 | Tsubata et al. |

FOREIGN PATENT DOCUMENTS

| JP | 10-268349 A | 10/1998 |
| JP | 2001-264798 A | 9/2001 |
| JP | 2006-323341 A | 11/2006 |
| WO | WO 2006/064832 | * 6/2006 |
| WO | WO 2007/108181 A1 | 9/2007 |

* cited by examiner

*Primary Examiner* — Dung Nguyen
*Assistant Examiner* — Tai Duong
(74) *Attorney, Agent, or Firm* — Birch, Stewart, Kolasch & Birch, LLP (57) ABSTRACT

A liquid crystal device 10 of the present invention includes conductive films 81*a*, 81*b* for storage capacitors, i.e., a first conductive film 81*a* and a second conductive film 81*b*, which are connected to two adjacent pixel electrodes 44*a*, 44*b*, respectively, via contact sections 70*a*, 70*b* formed through a second insulating film 62. The part of a storage capacitor 83 located below the conductive films 81*a*, 81*b* is divided into a first capacitor line 83*a* arranged below the first conductive film 81*a* and a second capacitor line 83*b* arranged below the second conductive film 81*b*.

4 Claims, 12 Drawing Sheets

FIG.12 ated between the substrates. One of the substrates includes signal lines arranged parallel, a gate wiring line arranged to intersect with the signal lines, a switching element arranged at a crossover section where the signal line and the gate wiring line intersect each other, a pixel electrode connected to the switching element, and a capacitor line that is arranged parallel to the gate wiring line so that a capacitor is formed between the capacitor line and the pixel electrode. The pixel electrode includes at least two pixel electrodes, which are adjacently arranged so that the outer edges thereof overlap with the capacitor line. A first insulating film, a conductive film and a second insulating film are arranged between the capacitor line and the pixel electrode. The first insulating film is arranged on the capacitor line. The conductive film is arranged on the first insulating film so as to at least partly overlap with the capacitor line. The second insulating film is arranged on the conductive film. The conductive film includes a first conductive film and a second conductive film, which are connected to the two adjacent pixel electrodes, respectively, via contact sections formed through the second insulating film. The part of the capacitor line located below the conductive film is divided into a first capacitor line arranged below the first conductive film and a second capacitor line arranged below the second conductive film.

LIQUID CRYSTAL DEVICE AND TELEVISION RECEIVER

TECHNICAL FIELD

The present invention relates to a liquid crystal device and a television receiver having the same.

BACKGROUND ART

A liquid crystal device is known, which has a construction that includes a pair of substrates and a liquid crystal layer arranged therebetween. One of the substrates is provided as an active matrix substrate that includes pixel electrodes. The active matrix substrate has a construction, in which gate wiring lines and signal lines are arranged on a transparent substrate so as to form a grid pattern. Switching elements such as TFTs are provided at crossover sections where the gate wiring lines and the signal lines intersect each other. At each area surrounded by the gate wiring lines and the signal lines, a pixel electrode is arranged to form a pixel as the smallest unit of an image to be displayed.

In order to improve quality in display, or specifically, to enhance the brightness, the liquid crystal device is expected to have high aperture ratio, which can be achieved by pixel electrodes extended as much as possible. In this connection, a technique for increasing the aperture ratio is provided, according to which the pixel electrodes are arranged on the active matrix substrate so as to overlap with the gate wiring lines and/or the signal lines, for example. This construction can achieve increase in aperture ratio. However, the coupling capacitance between the pixel electrode and the wiring lines is also increased, which may affect the display. The measures therefor are needed.

Patent Document 1: JP-A-2001-264798

Problem to be Solved by the Invention

Patent Document 1 describes an interlayer insulating film, which is provided on an active matrix substrate so as to be arranged between wiring lines and pixel electrodes. Thereby, the coupling capacitance between the pixel electrode and the wiring lines can be reduced even when the aperture ratio is increased for improvement in image quality. Further, this construction allows for improvement in reliability of peripheral circuit connection in a liquid crystal display device.

Patent document 1 provides measures for the coupling between the pixel electrode and the wiring lines, as described above. However, measures for the coupling between pixel electrodes are not provided. The coupling between adjacent pixel electrodes may have a considerable effect, particularly when the pixel electrodes are extended to overlap with the wiring lines in order to increase the areas of pixel electrodes and therefore the aperture ratio.

DISCLOSURE OF THE INVENTION

The present invention was made in view of the foregoing circumstances, and an object thereof is to provide a liquid crystal device in which the coupling capacitance between adjacent pixel electrodes is reduced while the aperture ratio is increased for improvement in visual quality. A further object of the present invention is to provide a television receiver having the liquid crystal device.

Means for Solving the Problem

In order to solve the above problem, a liquid crystal device according to the present invention includes a pair of substrates and a liquid crystal layer arranged between the substrates.

Firstly, the present liquid crystal device can achieve increase in aperture ratio, because adjacent pixel electrodes are extended so that the outer edges thereof overlap with the capacitor line.

The second is that the present construction allows for reduction in the coupling capacitance between adjacent pixel electrodes. In the construction of the present invention where the outer edges of adjacent pixel electrodes are arranged close to each other so as to overlap with the capacitor line, the coupling capacitance between the adjacent pixel electrodes is considerable high, which can affect display provided by the present liquid crystal device. In view of this, according to the present invention, the part of the capacitor line located below the conductive film is divided into a portion overlapped with the first conductive film of the conductive film and a portion overlapped with the second conductive film of the conductive film. Thereby, the coupling capacitance between the adjacent pixel electrodes can be reduced, without reducing the aperture ratio.

BEST MODE FOR CARRYING OUT THE INVENTION

Hereinafter, an embodiment of a liquid crystal device and a television receiver according to the present invention will be explained with reference to the drawings.

Figure 1:
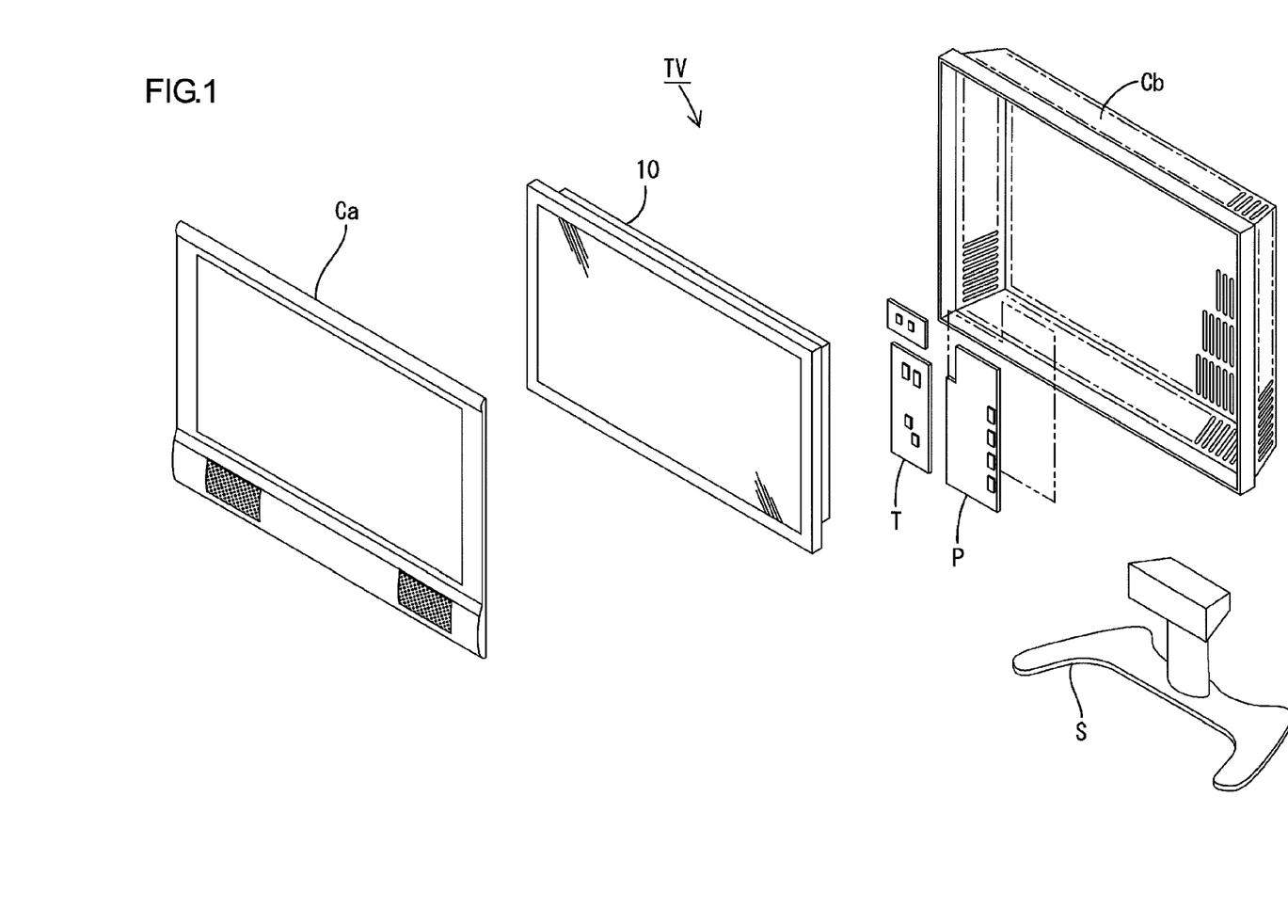
FIG. 1 is an exploded perspective view showing an embodiment of a television receiver.
Figure 2:
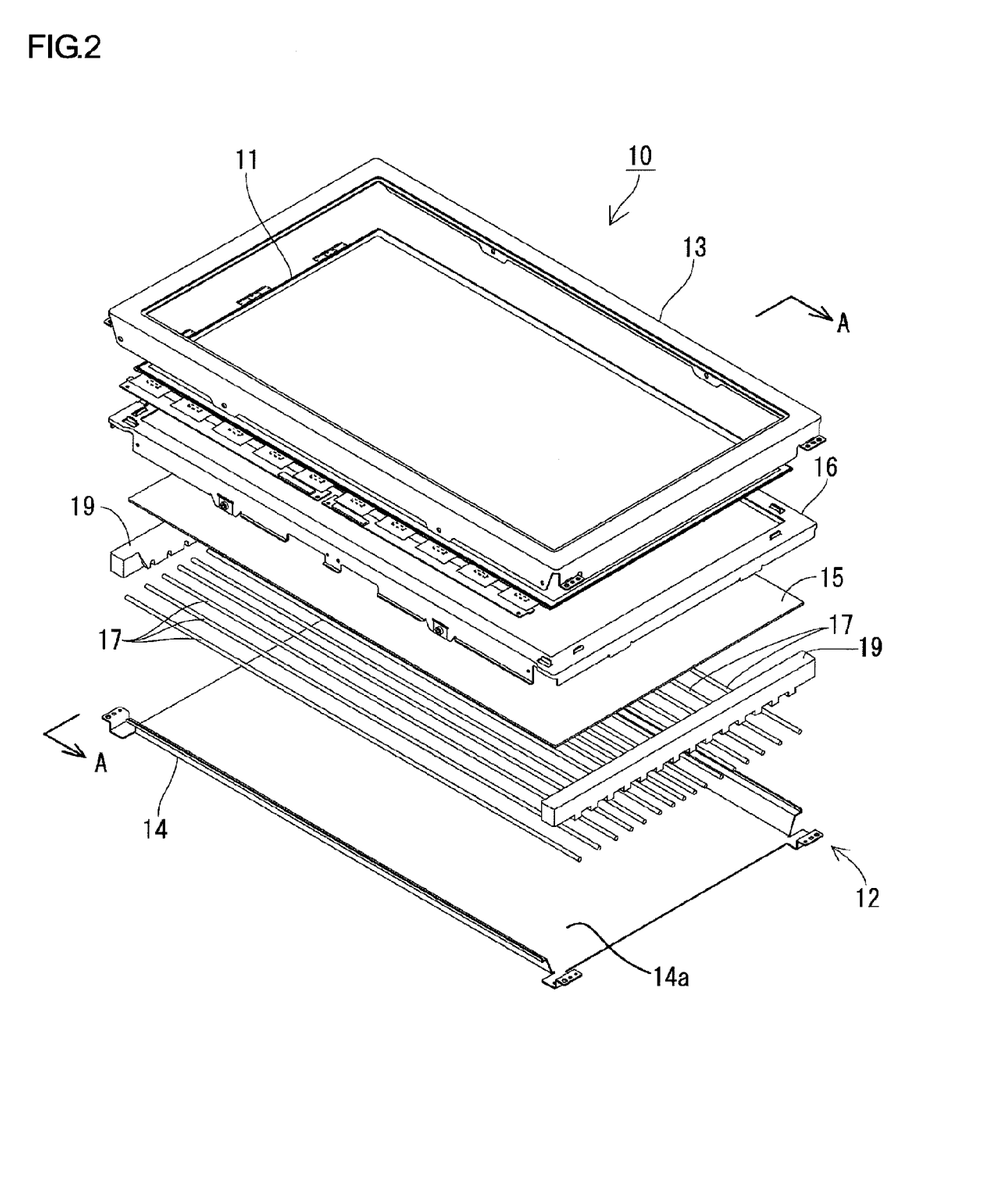
FIG. 2 is an exploded perspective view of a liquid crystal device included in the television receiver shown in FIG. 1.
Figure 3:
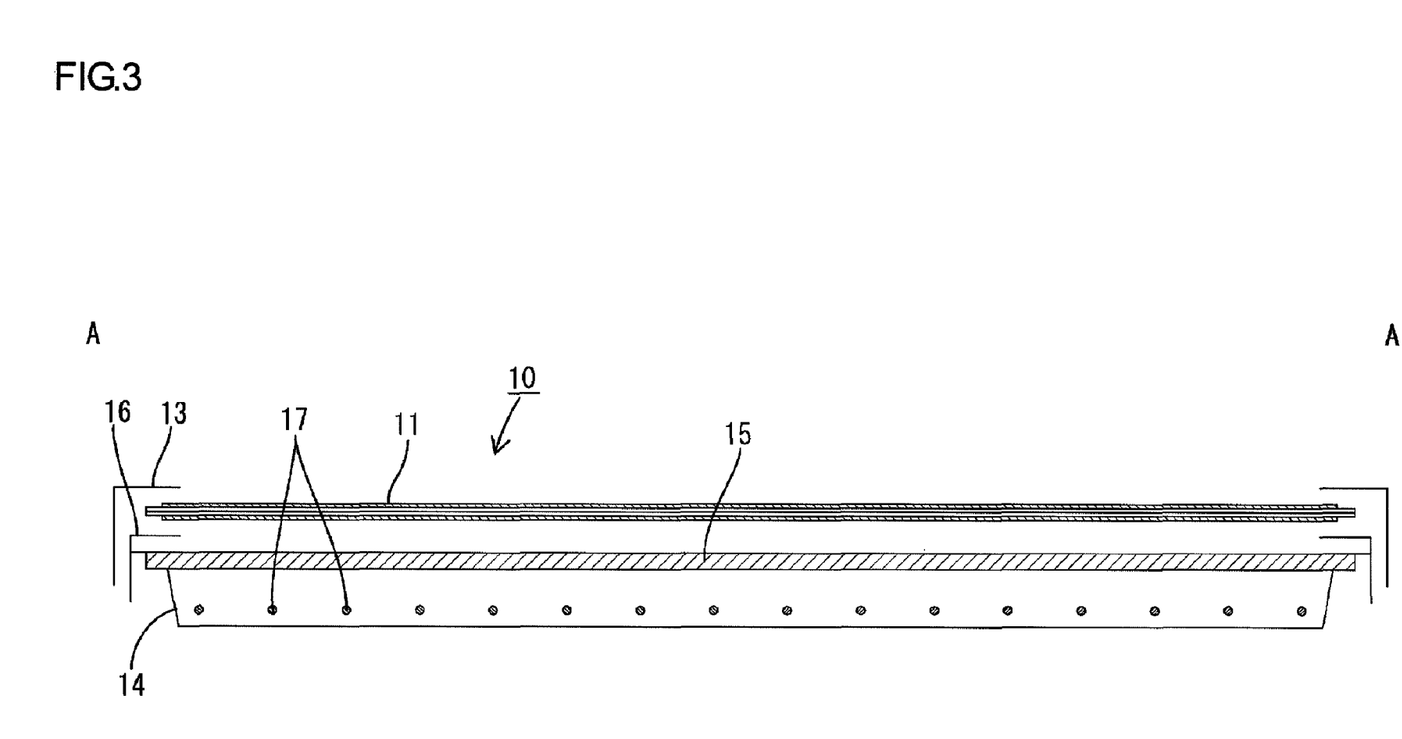
FIG. 3 is a schematic sectional view of the liquid crystal device.

FIG. 1 is an exploded perspective view showing the general construction of the television receiver TV according to the present embodiment. FIG. 2 is an exploded perspective view showing the general construction of the liquid crystal display device (liquid crystal device) 10 included in the television receiver TV. FIG. 3 is a sectional view showing the cross-sectional configuration of FIG. 2 along the line A-A.

Referring to FIG. 1, the television receiver TV according to the present embodiment includes the liquid crystal display device (liquid crystal device) 10, and front and back cabinets Ca and Cb capable of holding the liquid crystal display device 10 therebetween. Further included are a power source P, a tuner T and a stand S. The liquid crystal display device 10 forms a horizontally-elongated rectangular shape as a whole. Referring to FIGS. 2 and 3, the liquid crystal display device 10 includes a liquid crystal panel 11 as a display panel having a rectangular shape when viewed planarly, and further includes a backlight device (a lighting device for a display device) 12 as an external light source, which are integrally held by a bezel 13 and the like.

The liquid crystal panel 11 is a so-called active matrix type, in which liquid crystal (or a liquid crystal layer), with an optical property that changes with applied voltage, is sealed in the gap between an element substrate (or active matrix substrate) capable light transmission and a counter substrate (or CF substrate) capable of light transmission.

The backlight device 12 is a so-called direct-light type backlight, which includes light sources to be arranged directly below the back surface of the liquid crystal panel 11. The backlight device 12 includes a chassis 14 having an opening on its front side (or light emitting side), a reflective sheet 14a with which the chassis 14 is lined, an optical member 15 arranged to cover the opening of the chassis 14, a frame 16 arranged to fix the optical member 15, and a plurality of cold cathode tubes 17 contained in the chassis 14. Further included are lamp holders 19, which can shield the end portions of the cold cathode tubes 17 from light while having light reflectivity as their own property.

Next, the construction of the liquid crystal panel 11 will be explained in detail.

Figure 4:
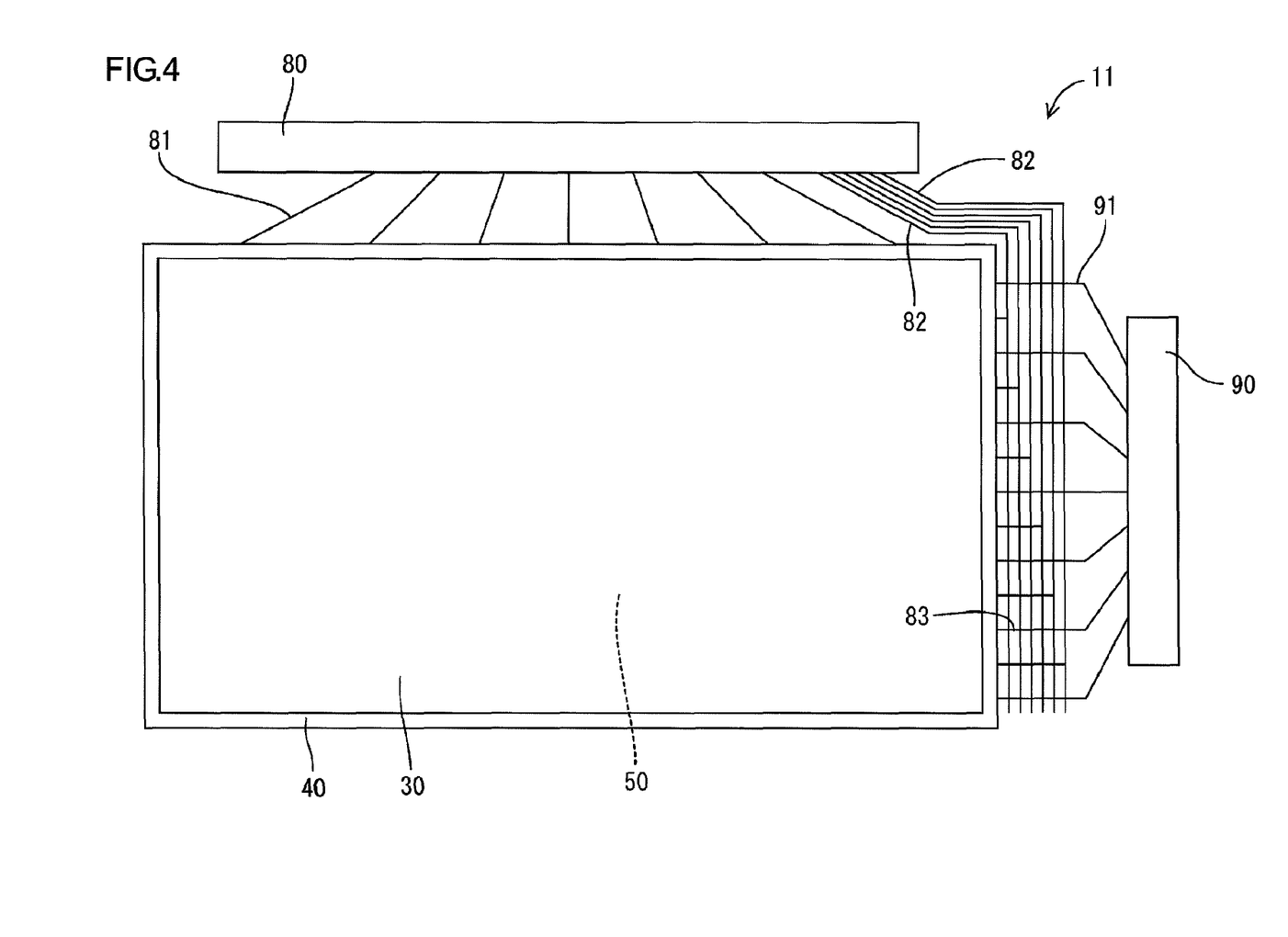
FIG. 4 is a plan view schematically showing the driver circuits and the wiring configuration of a liquid crystal panel.
Figure 5:
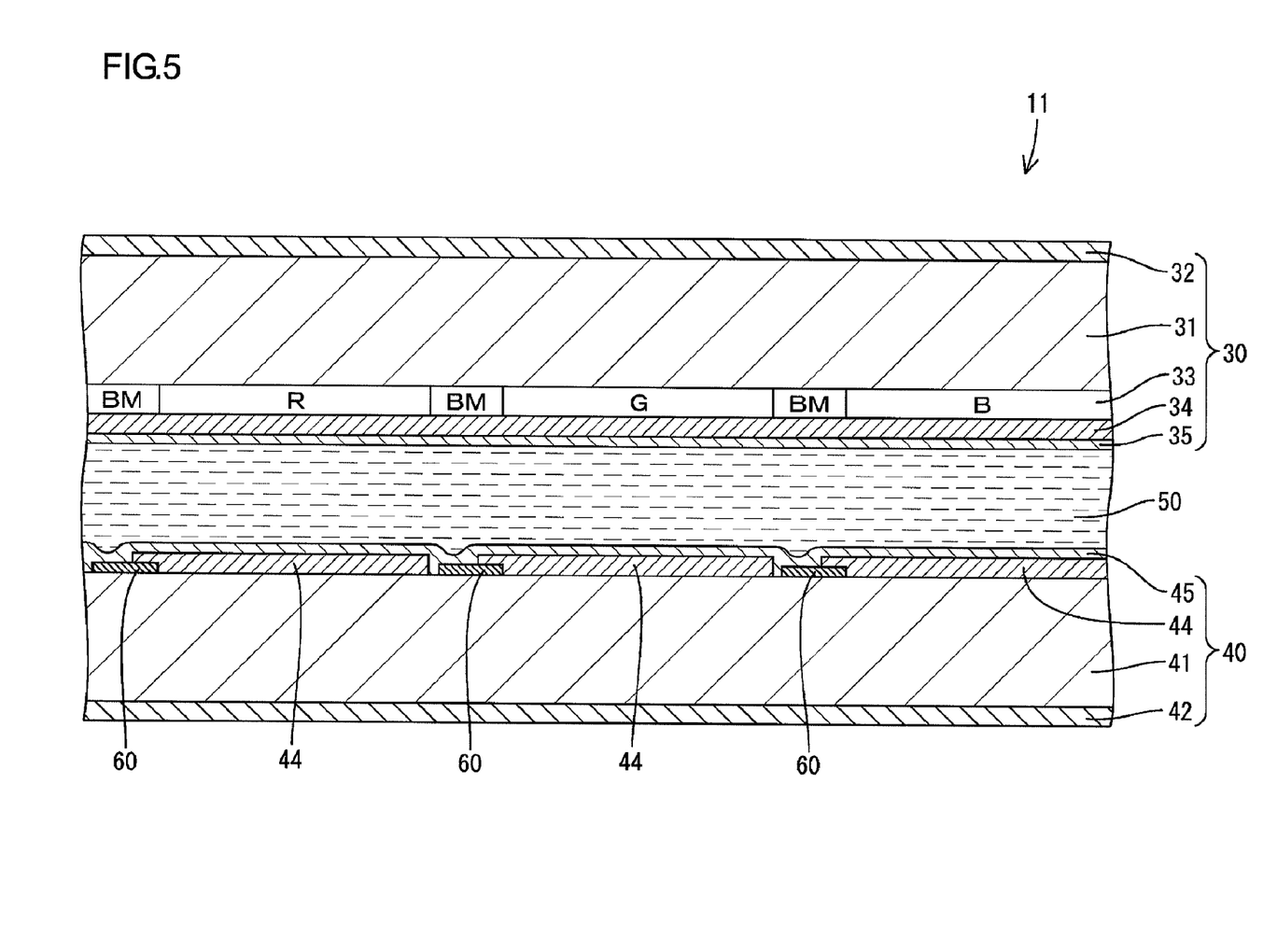
FIG. 5 is a diagram schematically showing the cross-sectional configuration of the liquid crystal panel.
Figure 6:
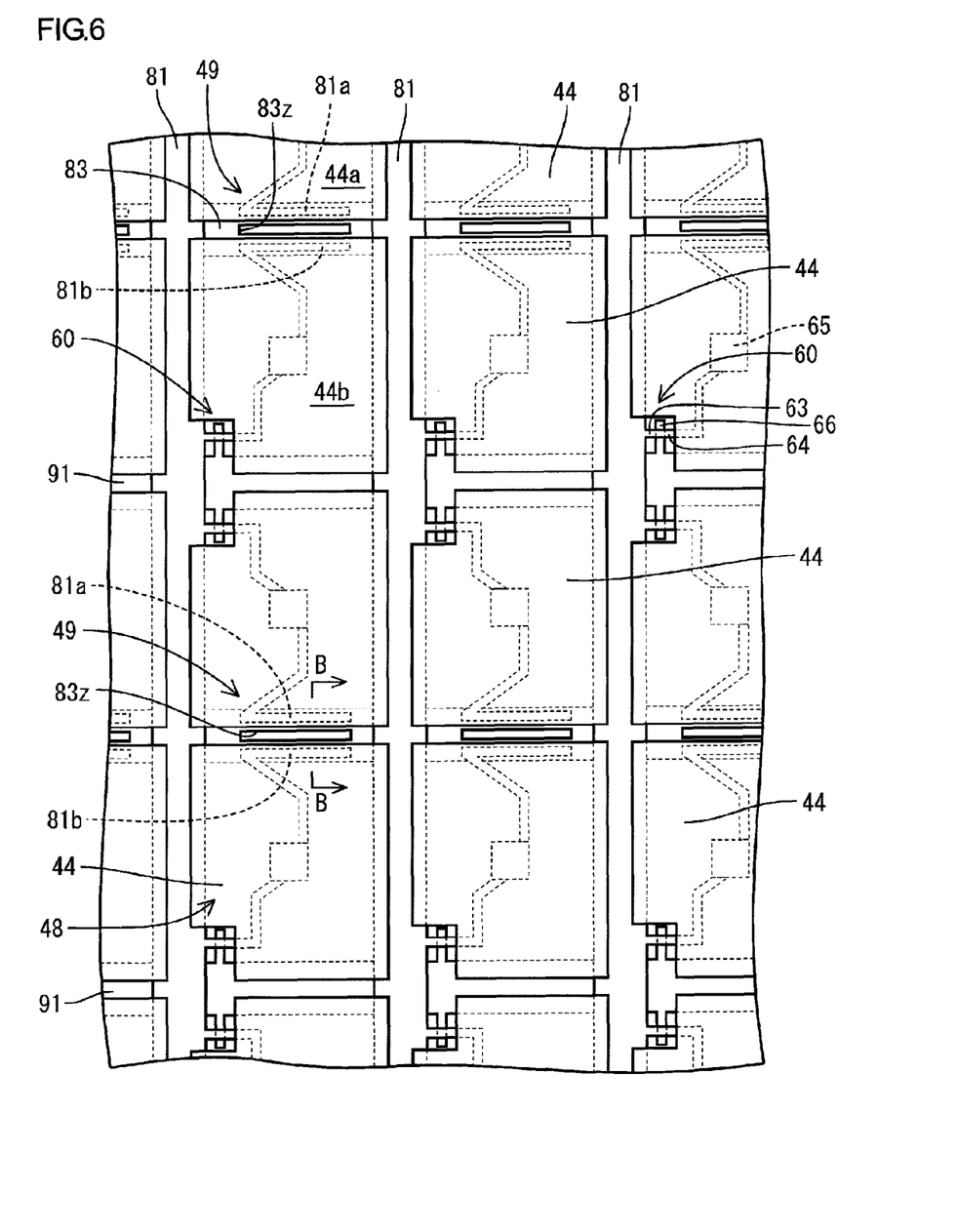
FIG. 6 is a schematic plan view showing the configuration of pixels surrounded by source wiring lines and gate wiring lines.
Figure 7:
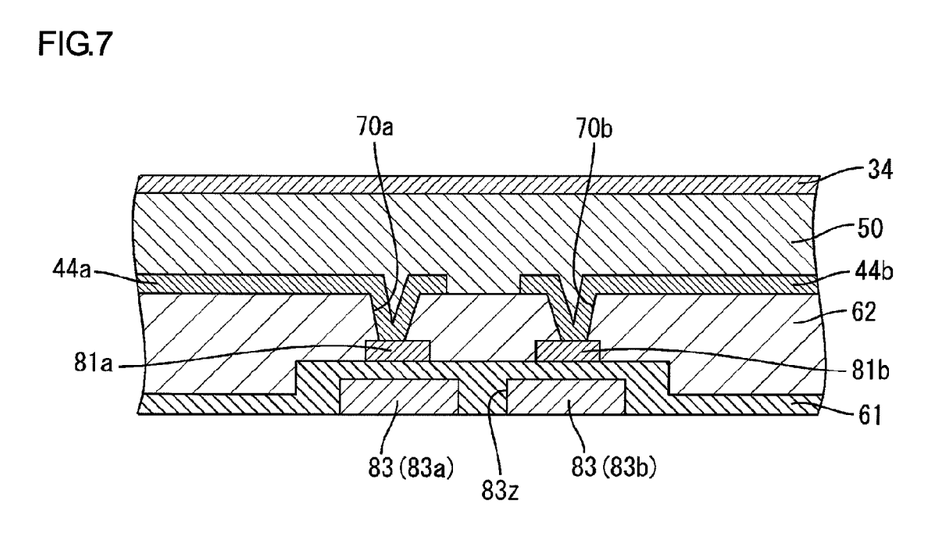
FIG. 7 is a sectional view of FIG. 6 along the line B-B.

FIG. 4 is a plan view schematically showing the driver circuits and the wiring configuration of the liquid crystal panel 11. FIG. 5 is a diagram schematically showing the cross-sectional configuration of a characteristic part of the liquid crystal panel 11. FIG. 6 is a schematic plan view showing the configuration of pixels surrounded by source wiring lines (or signal lines) and gate wiring line (or scanning lines). FIG. 7 is a sectional view of FIG. 6 along the line B-B. In FIG. 7, alignment films 35, 45 are omitted and hence not shown.

Referring to FIGS. 4 and 5, the liquid crystal panel 11 includes a pair of substrates 30, 40, which are attached to each other so as to face each other while a gap of a predetermined size is kept therebetween. Liquid crystal is sealed between the substrates 30, 40 so as to form a liquid crystal layer 50.

The substrate 40 (hereinafter, sometimes referred to as "element substrate 40") is provided as an element substrate (or active matrix substrate), which includes thin-film transistors as semiconductor elements (i.e., TFTs as switching elements) 60 arranged on the liquid crystal layer 50 side of a glass substrate 41. Further included are pixel electrodes 44 electrically connected to the thin-film transistors 60, and an alignment film 45 arranged on the liquid crystal layer 50 side of the thin-film transistors 60 or the pixel electrodes 44. A polarizing plate 42 is arranged on the glass substrate 41 so as to be located at the opposite side of the liquid crystal layer 50.

The pixel electrodes 44 are formed of transparent conductive films, e.g., made of ITO (Indium Tin Oxide), and are arranged in a matrix so as to form a pattern of pixel electrodes on the liquid crystal layer 50 side of the element substrate 40. Specifically, each pixel electrode 44 is connected to the drain electrode 64 of the thin-film transistor 60 via a contact hole 65 (See FIG. 6), so that a voltage can be selectively applied thereto by the switching operation of the thin-film transistor 60. The alignment film 45 is formed of a rubbed alignment film, e.g., made of polyimide. The polarizing plate 42 adopted in the present embodiment can be formed by uniaxially stretching a transparent film immersed in iodine or dye, for example.

On the other hand, the substrate 30 (hereinafter, sometimes referred to as "counter substrate 30") is provided as a counter substrate, which includes a color filter 33 that is arranged on the liquid crystal layer 50 side of a glass substrate 31 and has color sections R, G, B capable of selectively transmitting light of R (Red), G (Green) or B (Blue) color. The substrate 30 further includes a counter electrode 34 arranged on the liquid crystal layer 50 side of the color filter 33, and an alignment film 35 arranged on the liquid crystal layer 50 side of the counter electrode 34. A polarizing plate 32 is arranged on the glass substrate 31 so as to be located at the opposite side of the liquid crystal layer 50.

The color filer 33 includes a black matrix BM arranged at the boundaries between the color sections R, G, B. The black matrix BM is arranged to overlap with or cover the non-pixel areas of the element substrate 40 (i.e., the areas having the thin-film transistors 60 formed thereon). The counter electrode 34 is formed of a transparent conductive film, e.g., made of ITO (Indium Tin Oxide), and is arranged solidly on the entire surface of the counter substrate 30 on the liquid crystal layer 50 side. The alignment film 35 is formed of a rubbed alignment film, e.g., made of polyimide. The polarizing plate 32 adopted in the present embodiment can be formed by uniaxially stretching a transparent film immersed in iodine or dye, for example.

Returning to FIG. 4, a plurality of source wiring lines (or signal lines) 81 for supplying an image signal from a source driver 80 to each pixel, a plurality of gate wiring lines (or scanning lines) 91 for supplying a scan signal from a gate driver 90 to the TFT 60 of each pixel, and storage capacitor lines (or capacitor lines) 83 for supplying an electrical signal from the source driver 80 for the capacitor of each pixel are provided on the element substrate 40. The storage capacitor lines 83 are connected, via contact holes (not shown), to peripheral wiring lines 82 connected to the source driver 80.

Referring to FIG. 6, each area surrounded by the source wiring lines 81 and the gate wiring lines 91 is provided as a pixel section (or pixel area) 48 formed of the pixel electrode 44. In each pixel section 48, the liquid crystal layer (or a liquid crystal element) 50 and the storage capacitor 49 are connected in parallel. Referring to FIG. 7, the storage capacitor 49 is formed of an insulating film 61 arranged between the storage capacitor line (as the electrode of the capacitor) 83 and the pixel electrode 44. The storage capacitor 49 is thus provided in the present construction. When the TFT 60 is turned ON, an image signal (or a drive voltage) is written into the pixel section 48. The voltage is held on the storage capacitor 49 even after turn-off of the TFT 60.

On the element substrate 40 of the liquid crystal panel 11, the gate wiring lines 91 and the source wiring lines 81 are arranged to intersect each other, as described above. At each crossover section of the wiring lines, the TFT 60 having a source electrode 63, a gate electrode 66 and a drain electrode 64 is arranged as shown in FIG. 6. The source electrode 63 is connected to the source wiring line 81, while the gate electrode 66 is connected to the gate wiring line 91. Each pixel section 48 is provided as an area surrounded by the gate wiring lines 91 and the source wiring lines 81 intersecting each other. In the present embodiment, two pixel electrodes 44 are provided in each pixel section 48. In the liquid crystal panel 11 of the present embodiment, each pixel electrode 44 is arranged so that the outer edge thereof partly overlaps with the source wiring lines 81 and the gate wiring line 91, in order to increase the aperture ratio of the pixel.

Referring to FIGS. 6 and 7, each of two pixel electrodes 44a, 44b, which are adjacently arranged across the storage capacitor line 83 from each other, is arranged so that the outer edge thereof partly overlaps with the storage capacitor line 83. Specifically, referring to FIG. 7, a layered structure is provided at the area including the storage capacitors 49 (i.e., the area corresponding to the line B-B in FIG. 6), so as to include the storage capacitor line 83 (83a, 83b), the gate insulator (as a first insulating film) 61 formed on the storage capacitor line 83, conductive films 81a, 81b formed on the gate insulator 61, an interlayer insulating film (as a second insulating film) 62 formed on the conductive films 81a, 81b, and the pixel electrodes 44 (44a, 44b) formed on the second insulating film 62, which are thus stacked.

Each of the pixel electrodes 44a, 44b is arranged so that the outer edge thereof overlaps with the storage capacitor line 83, as described above. The pixel electrodes 44a, 44b are conductively connected to the conductive film 81a (as a first conductive film 81a) and the conductive film 81b (as a second conductive film 81b) via contact sections 70a, 70b, respectively. Each of the conductive films 81a, 81b is connected to the drain electrode 64, and can function as an electrode that is arranged across the gate insulator 61 from the storage capacitor line 83 so as to form the storage capacitor. In the present embodiment, the distance between the first conductive film 81a and the second conductive film 81b is set to 11 µm, while the distance between the pixel electrodes 44a, 44b is set to 9 µm.

The contact sections 70a, 70b are provided on the interlayer insulating film 62. The interlayer insulating film 62 can be formed of an insulating material having a permittivity of 3.4, for example, and the film thickness thereof is set to 2.6 µm. The conductive films 81a, 81b are provided as the same layer as the source wiring lines 81, and can be formed by the same process as for the source wiring lines 81, using the same material, for example. Specifically, it can be formed using a material such as aluminum, chromium, tantalum or titanium.

The gate insulator 61 can be formed of an insulating material having a permittivity of 6.9, for example, and the film thickness thereof is set to approximately 0.4 µm. The part of the storage capacitor line 83 located below the conductive films 81a, 81b is divided by a slit 83z into separate portions, or specifically, into a first capacitor line 83a arranged below the first conductive film 81a and a second capacitor line 83b arranged below the second conductive film 81b. In the present embodiment, the distance between the first capacitor line 83a and the second capacitor line 83b is set to 7 µm.

Figure 12:
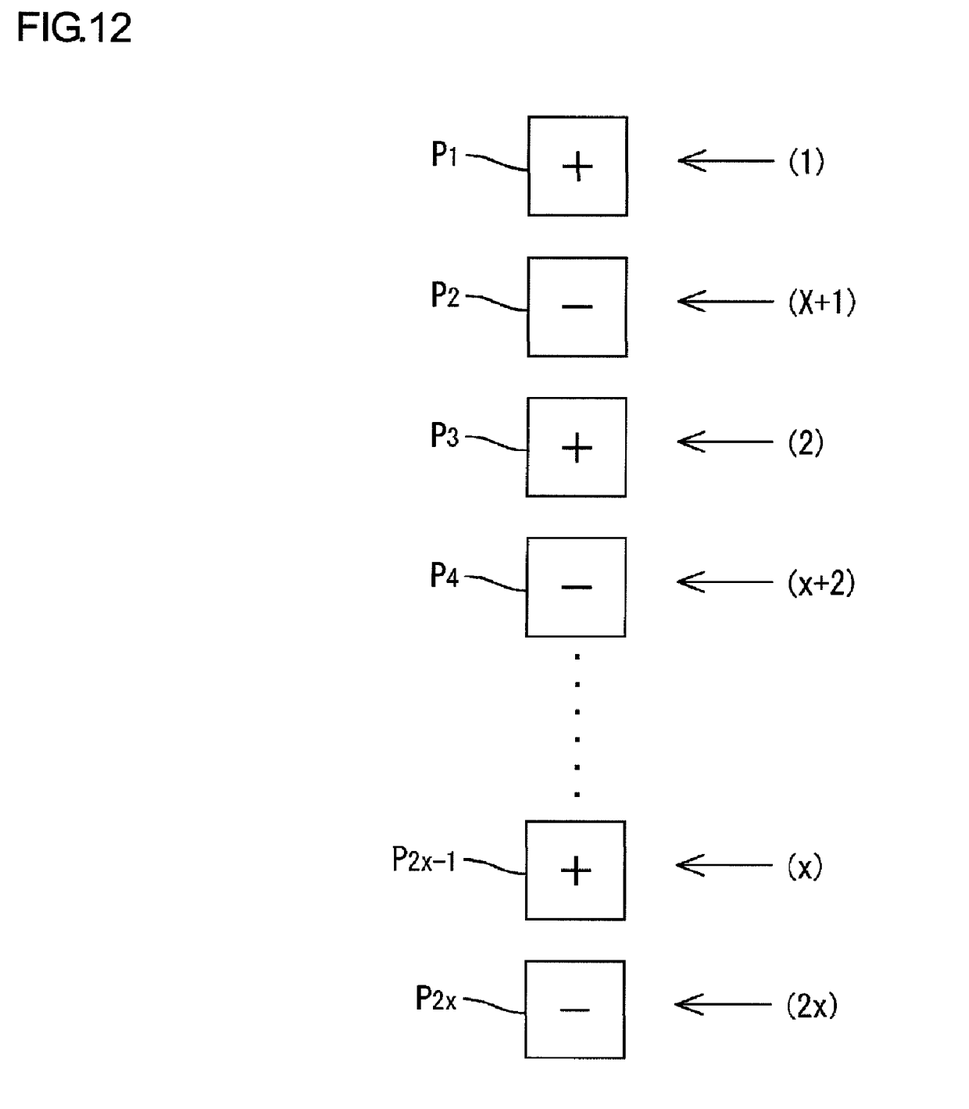
FIG. 12 is an explanatory diagram showing block inversion driving.

Shown above is the construction of the liquid crystal panel 11 according to the present embodiment. Hereinafter, a method for writing into the pixel electrodes 44 will be described. FIG. 12 is a diagram schematically showing how the writing method performs writing into pixel electrodes 44 arranged along the extending direction of the source wiring line 81. In the liquid crystal panel 11 of the present embodiment, the polarity of a signal to be written by the source wiring line 81 into each pixel electrode P1 to P2X alternates between positive and negative, so that the polarities of signals to be written into adjacent pixel electrodes (e.g., pixel electrodes P1 and P2) are reversed. The present embodiment adopts block inversion driving, by which signals having a first polarity (e.g., positive polarity) are sequentially written (by first to X-th writing) into the pixel electrodes P1, P3 to P2X−1 (on the odd lines), and thereafter signals having a second polarity (e.g., negative polarity) are sequentially written (by (X+1)-th to (2X)-th writing) into the pixel electrodes P2, P4 to P2X (on the even lines).

In the liquid crystal panel 11 included in the liquid crystal device 10 of the present embodiment, as described above, each pixel electrode 44a, 44b is arranged so that the outer edge thereof overlaps with the storage capacitor line 83, in order to increase the aperture ratio of the pixels. However, according to the present construction, the coupling capacitance between adjacent pixel electrodes 44a, 44b may be considerable high, which can contribute to display failure such as contrast reduction. In view of this, the storage capacitor line 83 has a divisional structure as described above, in the liquid crystal panel 11 of the present embodiment. That is, the storage capacitor line 83 for the storage capacitor 49 is divided into the first capacitor line 83a and the second capacitor line 83b, so as to be solely provided below the first conductive film 81a and the second conductive film 1b. Due to the divisional structure of the storage capacitor line 83, the coupling capacitance between adjacent pixel electrodes 44a, 44b can be reduced, and thereby display failure such as contrast reduction described above may be prevented.

If the coupling capacitance between adjacent pixel electrodes 44a, 44b is high in the construction adopting the above-described driving method or block inversion driving, in general, brighter lines or less bright lines may be sequentially displayed while the scanning of odd lines and even lines is alternately repeated, which results in horizontal streaks in display. However, according to the present embodiment, the storage capacitor line 83 has a divisional structure, and thereby the coupling capacitance between adjacent pixel electrodes 44a, 44b can be reduced while the high aperture ratio is maintained. Consequently, the horizontal streaks in display may be prevented in spite of adopting the block inversion driving.

Figure 11:
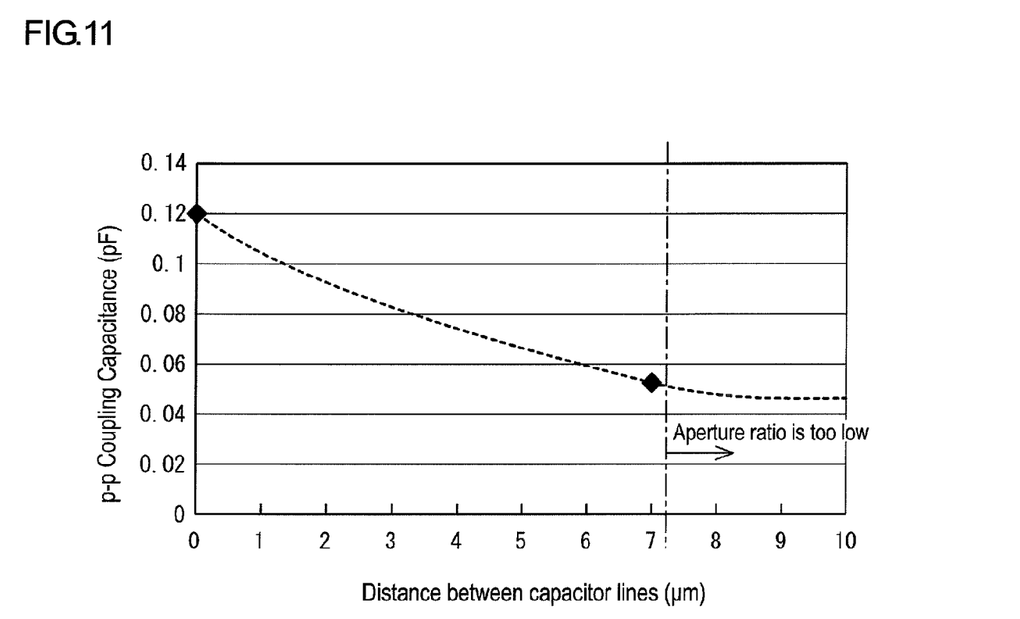
FIG. 11 is a graph showing the relationship between the distance between capacitor lines and p-p coupling capacitance according to the construction of the present embodiment.

Specifically, the storage capacitor line 83 is divided by the slit 83z into the first capacitor line 83a and the second capacitor line 83b, which are arranged at a predetermined distance (as a distance between capacitor lines) from each other. As shown in FIG. 11, the coupling capacitance between pixel electrodes 44a, 44b (i.e., p-p coupling capacitance) can be reduced if the above distance is increased. However, when the distance between capacitor lines is set to an excessively large value (e.g., a value equal to or larger than 7.2 μm), the brightness of display may be decreased as a result of reduction in aperture ratio of pixels. For this reason, it is preferable to set the distance between capacitor lines to a value equal to or smaller than 7 μm, from the viewpoint of reducing the p-p coupling capacitance and maintaining the aperture ratio of pixels.

Figure 8:
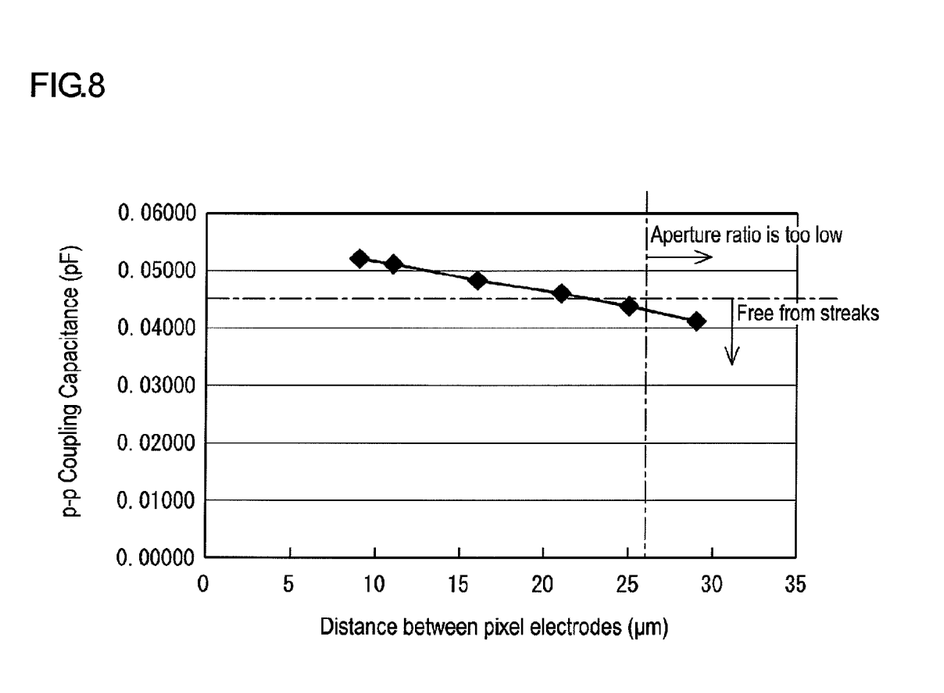
FIG. 8 is a graph showing the relationship between the distance between pixel electrodes and p-p coupling capacitance according to the construction of the present embodiment.
Figure 10:
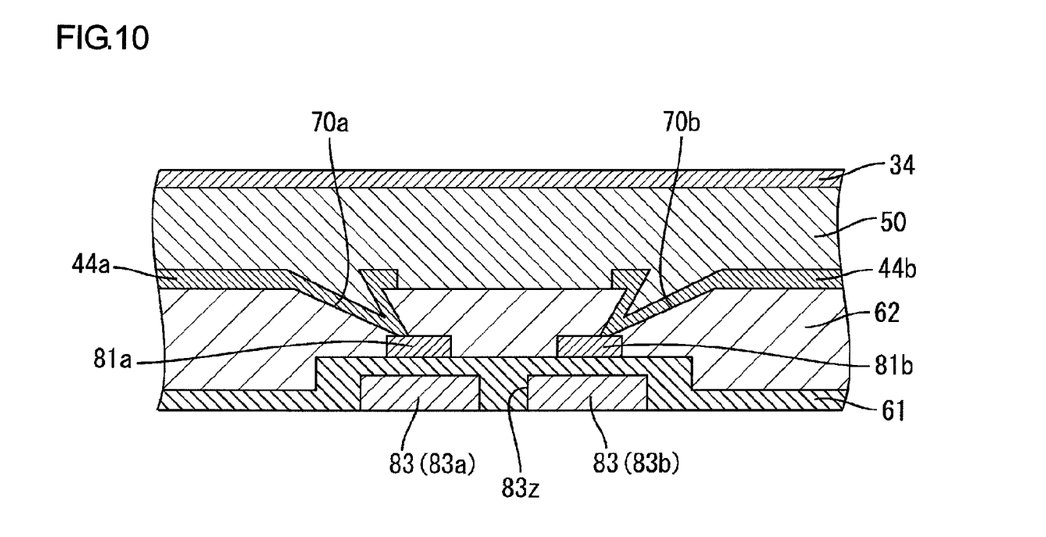
FIG. 10 is a diagram showing the cross-sectional configuration of a modification of the liquid crystal panel along the line B-B.

Further, in a modified construction where the distance between adjacent pixel electrodes 44*a*, 44*b* is appropriately changed as shown in FIG. 10, the p-p coupling capacitance corresponding to varying distance (as the distance between pixel electrodes) is determined, and thereby the result shown in FIG. 8 is obtained. At the time, the distance between the capacitor lines is fixed to 7 μm, while the distance between the conductive films 81*a*, 81*b* (as the distance between conductive films) is fixed to 11 μm.

Figure 9:
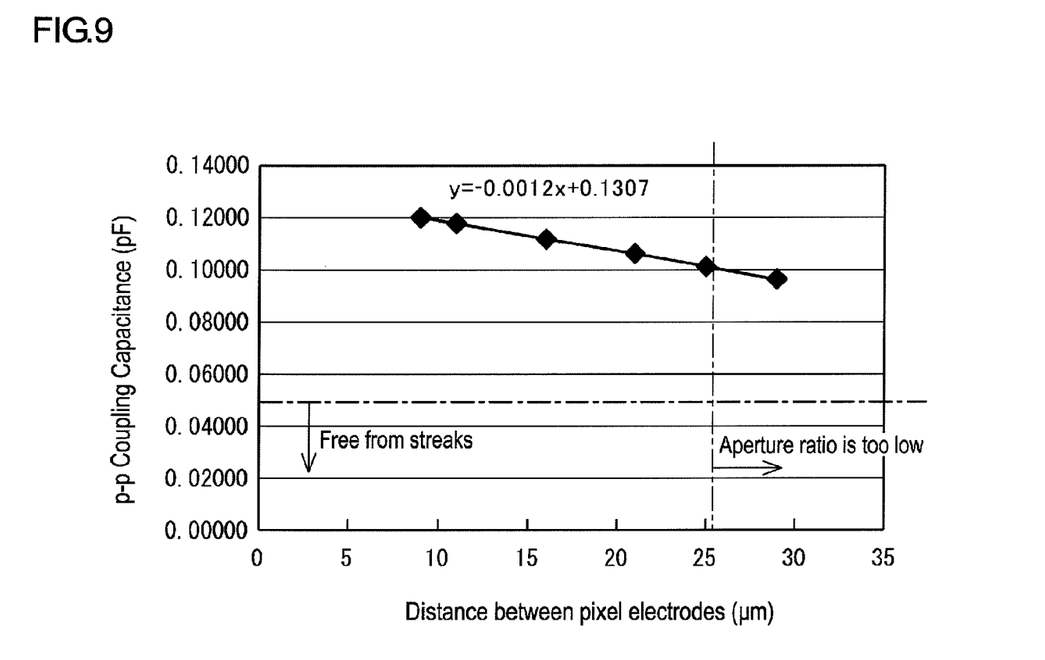
FIG. 9 is a graph showing the relationship between the distance between pixel electrodes and p-p coupling capacitance according to a comparative construction.

Referring to FIG. 8, if the distance between pixel electrodes exceeds 25 μm, the brightness of display may be reduced as a result of reduction in aperture ratio, although the p-p coupling capacitance is reduced as a result of increase in distance between pixel electrodes. Therefore, it is preferable to set the distance between pixel electrodes to a value equal to or smaller than 25 μm, in order to prevent decrease in brightness resulting from reduction in aperture ratio. On the other hand, if the distance between pixel electrodes is set to a value smaller than 20 μm, display may have some streaks even when the distance between capacitor lines is maintained at 7 μm. Therefore, it is further preferable to set the distance between pixel electrodes to a value between 20 μm and 25 μm. In the case that the distance between capacitor lines is set to zero without adopting the divisional structure, referring to FIG. 9, streaks cannot be eliminated from display regardless of the distance between pixel electrodes.

The invention claimed is:

1. A liquid crystal device comprising a pair of substrates and a liquid crystal layer arranged between the substrates, wherein one of the substrates includes:
    signal lines arranged parallel;
    a gate wiring line arranged to intersect with the signal lines;
    at least two switching elements each arranged at a crossover section where the signal line and the gate wiring line intersect each other;
    at least two pixel electrodes connected to the switching elements respectively;
    a capacitor line including a first capacitor line and a second capacitor line, the capacitor line being arranged parallel to the gate wiring line so that a capacitor is formed between the capacitor line and the pixel electrode;
    a first insulating film arranged on the capacitor line between the capacitor line and the pixel electrodes;
    a first conductive film and a second conductive film arranged on the first insulating film so as to at least partly overlap with the capacitor line, the first conductive film and the second conductive film connected to the respective pixel electrodes adjacently arranged thereto;
    a second insulating film formed on the conductive film, the second insulating film having contact holes formed therethrough, the contact holes extending to the first conductive film and the second conductive film, respectively, each of the contact holes having a V-shape with a first sloped wall and a second sloped wall, the first sloped wall being formed such that an upper edge thereof is closer to an edge of corresponding one of the first conductive film and the second conductive film away from the other one of the first conductive film and the second conductive film than a center of the corresponding one of the first conductive film and the second conductive film, the second sloped wall being slanted gentler than the first sloped wall with respect to a top surface of the corresponding one of the first conductive film and the second conductive film, wherein
    the at least two pixel electrodes are adjacently arranged with outer edges thereof overlapping with the capacitor line, each of the at least two pixel electrodes having a V-shaped portion and an edge portion, the V-shaped portion being formed along the V-shape of corresponding one of the contact holes and arranged therein, the edge portion extending from the V-shaped portion and being arranged such that an edge thereof is closer to the edge of the corresponding one of said first conductive film and the second conductive film than the center of the corresponding one of said first conductive film and the second conductive film,
    the first capacitor line is arranged below the first conductive film and the second capacitor line is arranged below the second conductive film.

2. A liquid crystal device as in claim 1,
    further comprising a driver configured to alternately generate a signal with a first polarity and a signal with a second polarity, to send the signal with the first polarity to one of the pixel electrodes via the signal line and to send the signal with the second polarity to another one of the pixel electrodes via the signal line.

3. A liquid crystal device as in claim 1,
    further comprising pixel areas each surrounded by said signal lines and said gate wiring lines
    the at least two pixel electrodes include a first pixel electrode and a second pixel electrode arranged in one of the pixel areas such that outer edges thereof overlap with said capacitor line.

4. A television receiver comprising a liquid crystal device as in claim 1.

\* \* \* \* \*